E. A. PARKER.
SALT SHAKER.
APPLICATION FILED APR. 20, 1910.

1,054,864.

Patented Mar. 4, 1913.

WITNESSES:
H. A. Lamb
S. W. Atherton

INVENTOR
Edmund A. Parker
BY
A. M. Wooster
ATTORNEY

UNITED STATES PATENT OFFICE.

EDMUND A. PARKER, OF MERIDEN, CONNECTICUT.

SALT-SHAKER.

1,054,864.  Specification of Letters Patent.  Patented Mar. 4, 1913.

Application filed April 20, 1910. Serial No. 556,588.

*To all whom it may concern:*

Be it known that I, EDMUND A. PARKER, a citizen of the United States, residing at Meriden, county of New Haven, State of Connecticut, have invented an Improvement in Salt-Shakers, of which the following is a specification.

This invention has for its object to provide a salt shaker which shall be simple and inexpensive to produce, highly ornamental in appearance and thoroughly wholesome and efficient in use as the salt contained therein does not come in contact with any metal.

With these and other objects in view I have devised the novel salt shaker which I will now describe, consisting of a body and a top of molded glass or other vitreous material and a cylindrical metallic retaining band or sleeve threaded at each end by which the top and body are detachably secured together.

Figure 1:
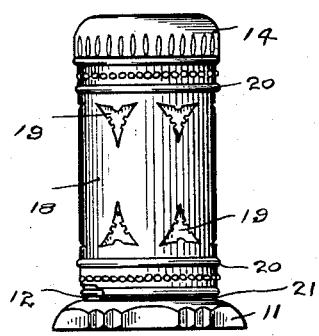
Figure 2:
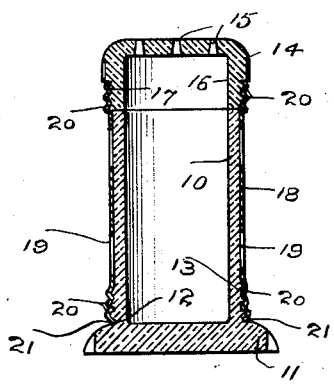

In the accompanying drawing forming a part of this specification, Figure 1 is an elevation of my novel salt shaker; and Fig. 2 is a longitudinal section thereof.

10 denotes the body and 11 a base molded integral therewith. At the intersection of the body and the base I provide a circular groove 12 and above the groove a screw thread 13 of slightly greater diameter than the body. The body and base are molded complete from glass or porcelain and the groove and thread are molded therein.

14 denotes the top which is likewise molded from glass and is provided with the usual perforations 15 and with an annular flange 16. The edge of the flange and the top of the body are made smooth so that the body and top lie in close engagement and salt is prevented from working in between them. On the outer side of the flange is a screw thread 17.

18 denotes a band or sleeve which may be made of solid silver or of a base metal and plated with gold or silver so as to give it a highly ornamental appearance. The band is provided with ornamental openings 19 through which the glass of the body shows and which enable the user to see how much salt there is in the shaker. At the top and bottom of the band are screw threads 20 which are adapted to engage screw threads 13 and 17 on the body and top respectively. The band fits the body closely. As both ends of the band are alike it makes no difference which end is engaged with the body. To fill the shaker, it is simply necessary to turn the top out of engagement with the upper screw thread on the band and then to turn it back to place after the body is filled. The band need never be removed from the body and may be fixed or removable as preferred. If the band is simply screwed down to place on the body it may be readily removed at any time, as for cleaning, by unscrewing. Should it be preferred, however, to have the band permanently attached to the body, the lower edge of the band is turned into groove 12 in the body, as at 21, which locks the band permanently to the body.

Having thus described my invention I claim:

A salt cellar comprising a cylindrical body member provided with a base and screw threads adjacent said base, a cover member adapted to rest on the top edge of said body member and provided with screw threads adjacent the lower edge thereof, and a metallic jacket having each end threaded to engage the respective threaded portions of said body and cover members, one of said members being provided with a groove adjacent its screw threads, the contiguous edge of said jacket being turned into the groove, whereby the jacket and member are permanently united and rotation of said jacket prevented.

In testimony whereof I affix my signature in presence of two witnesses.

EDMUND A. PARKER.

Witnesses:
  HELEN M. KING,
  ALBERT M. BUTLER.